Dec. 23, 1969   J. P. MANION ET AL   3,485,735
PROCESS FOR PREPARING CF$_4$ AND CClF$_3$ IN AN ELECTRICAL DISCHARGE
Filed Aug. 9, 1968

Inventors
Jean P. Manion
John A. Philopophos
Marquis B. Robinson
By Forest C. Sexton
Attorney

United States Patent Office 3,485,735
Patented Dec. 23, 1969

3,485,735
PROCESS FOR PREPARING $CF_4$ AND $CClF_3$ IN AN ELECTRICAL DISCHARGE
Jean P. Manion, Milwaukee, John A. Philosophos, Brookfield, and Marquis B. Robinson, Milwaukee, Wis., assignors to Allis-Chalmers Manufacturing Company, Milwaukee, Wis.
Continuation-in-part of application Ser. No. 536,450, Mar. 22, 1966. This application Aug. 9, 1968, Ser. No. 751,450
Int. Cl. B01k 1/00; C07c 3/24
U.S. Cl. 204—169                3 Claims

ABSTRACT OF THE DISCLOSURE

A process for preparing tetrafluoromethane and chlorotrifluoromethane by passing dichlorodifluoromethane through a region of transitional electrical discharge at a pressure of from about 200 to about 400 millimeters of mercury absolute.

CROSS REFERENCES TO RELATED APPLICATIONS

This application is a continuation-in-part of application Ser. No. 536,450, filed Mar. 22, 1966, now abandoned.

BACKGROUND OF THE INVENTION

This invention relates to a process for preparing tetrafluoromethane ($CF_4$) and chlorotrifluoromethane ($CClF_3$) and more particularly to an improved process for preparing $CF_4$ and $CClF_3$ using an electrical discharge.

$CF_4$ and $CClF_3$ are industrial chemicals which find use as refrigerants, as gaseous insulation materials in electrical equipment and as propellants in aerosols.

Very few methods are available for preparing $CF_4$ and $CClF_3$ from inexpensive starting materials and these methods although successful produce these gases in relatively low conversions and at relatively high energy costs. For example, U.S. Patent No. 2,725,410 teaches a method of preparing $CF_4$ and $CClF_3$ wherein carbon is heated in the presence of a fluorohalo compound such as dichlorodifluoromethane ($CCl_2F_2$) at a temperature between 2500° to 4000° C. using a high current electric arc (e.g., 10 to 30 amperes at 10 to 50 volts) at an arc pressure of 0.04 to 0.1 atmosphere. The reaction produces a multifarious mixture of products which contain about 5 mole percent $CF_4$ and 20 mole percent $CClF_3$. The total yield of these products produced per kilowatt hours (KWH) of electrical energy utilized is low, i.e., about 2 g./kw.-hr. Pressures of 0.10 atmosphere and lower are prescribed for the reaction since only at these low pressures is the undesirable reaction of free halogen with fluorocarbon products significantly minimized.

The lack of an economical synthesis has prevented the development of relatively large markets for $CF_4$ and $CClF_3$ and the art is therefore continually seeking more efficient processes for such a synthesis.

SUMMARY OF THE INVENTION

In accordance with the present invention, there is provided an improved process for preparing $CF_4$ and $CClF_3$ from inexpensive chemicals in good conversions at high energy yields which comprises passing dichlorodifluoromethane ($CCl_2F_2$) in a transitional electrical discharge region at a pressure of from about 200 to about 400 millimeters of mercury absolute (mm. Hg abs.).

DESCRIPTION OF THE PREFERRED EMBODIMENT

Figure 1:
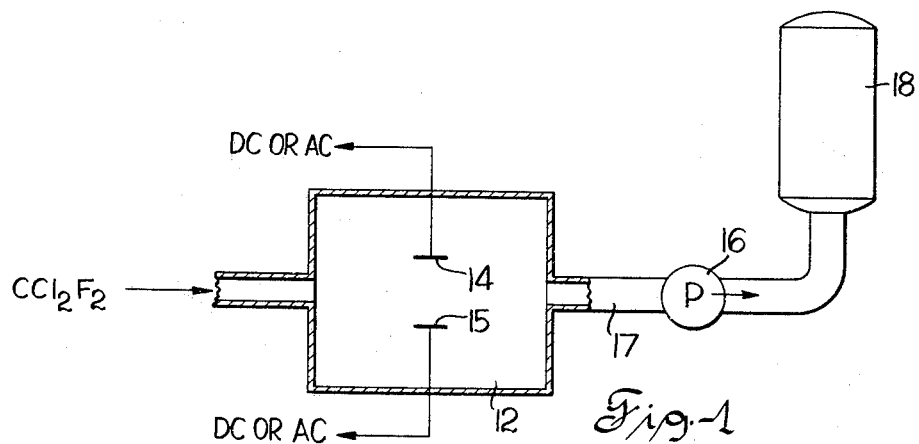
FIG. 1 is a schematic diagram of one embodiment of an apparatus for carrying out the process of the present invention.
Figure 2:
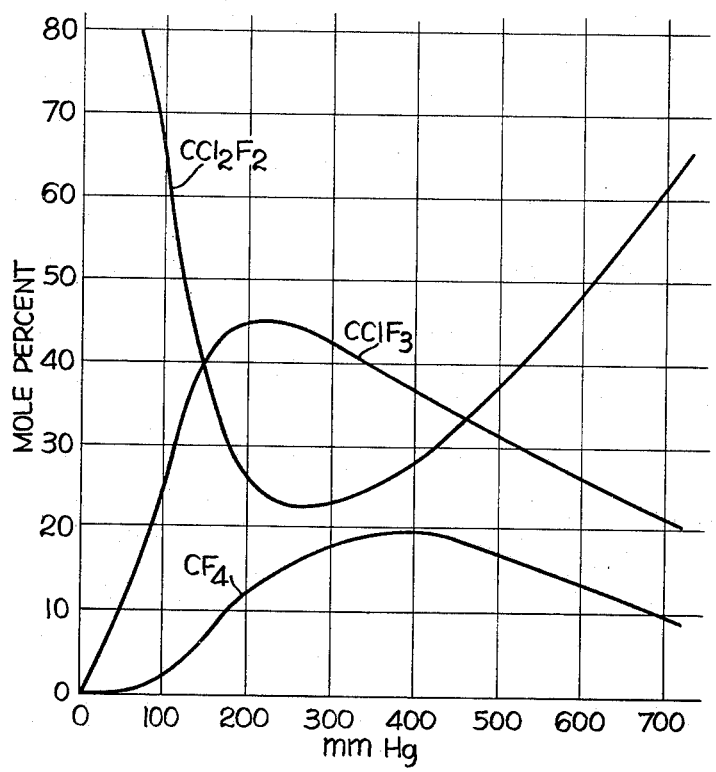
FIG. 2 is a graph plotting the mole percent of the products against the absolute pressure of the dichlorodifluoromethane.

The passage of the $CCl_2F_2$ between the electrodes of the transitional discharge in accordance with the process of the present invention gives a mixture of fluorocarbons, the components of which comprise about 12 to about 20 mole percent $CF_4$, and about 33 to about 45 mole percent $CClF_3$ (see FIG. 2). Energy yields for the conversion of $CCl_2F_2$ to $CF_4$ are in the range of about 34 to about 90 g./kw.-hr. Energy yields for the conversion of $CCl_2F_2$ to $CClF_3$ are in the range of about 145 to about 200 g./kw.-hr. If greater yields of $CF_4$ are desired, the $CClF_3$ may be separated from the gaseous product mixture and recycled through the transitional electrical discharge in accordance with the process of the present invention to convert the $CClF_3$ to $CF_4$.

The term transitional electrical discharge as used herein refers to an electrical discharge in a gas which occurs during the transition from the relatively low current and high voltage glow discharge to the high current and low voltage discharge of the electric arc as the discharge current between the electrodes of the discharge apparatus is increased. For example, currents in the range of about 0.1 to about 2 amperes at voltages in the range of about 150 to about 450 volts per centimeter of electrode gap distance may be employed to produce a transitional discharge in the process of the present invention.

The pressure of the $CCl_2F_2$ at which it is exposed to the transitional discharge is an essential and critical feature of the invention. As will be hereinafter illustrated, passing the gaseous $CCl_2F_2$ through the plasma in the transitional discharge at pressures below about 200 mm. Hg abs., or above about 400 mm. Hg abs., result in a rapid decrease in the conversion of $CCl_2F_2$ to $CF_4$ and $CClF_3$ as well as a rapid decrease in energy yield. Pressures in the range of about 200 to about 400 mm. Hg abs. are therefore essential if optimum yields are to be realized.

Referring to the figure, a schematic diagram of one embodiment of an apparatus for carrying out the process of the present invention, $CCl_2F_2$ which is to be activated is introduced through a reactant input duct 11 into a connecting discharge chamber 12 of the electrical discharge apparatus 10. Positioned within the chamber 12 are a first discharge electrode 14 and a second discharge electrode 15 which in turn are electrically connected to the output terminals of an alternating or direct current power supply, not shown. The electrodes may take many forms and the material of which the electrodes may be composed may be of various kinds. Any suitable metal conducting material such as tantalum, copper, silver, aluminum, iron, platinum, or the like may be used as an electrode material. Because the temperature at the electrodes may reach as high as 1000° C., when metals of relatively low melting points such as copper or aluminum are employed, it may be necessary to cool the electrodes, such as by circulation of a coolant fluid through channels in the electrode.

The gas pressure in the discharge chamber 12 is maintained at from about 200 to about 400 mm. Hg abs. by vacuum pump 16. The electrical potential across the electrodes 14, 15 is maintained at an amount effective to produce a transitional electrical discharge.

The $CCl_2F_2$ gas is exposed to the transitional electric discharge maintained between the electrodes thereby becoming excited into the plasma state. As will be obvious to those skilled in the art, the activation of the $CCl_2F_2$ in the region of transitional discharge may be either a batch or continuous process. Residence times of the $CCl_2F_2$ gas in the region of transitional discharge may vary from about 0.5 to 2 minutes or more.

Immediately adjacent the discharge electrodes 14, 15 is provided exit means 17 for the activated gas from the discharge chamber. The mixture of gaseous reaction products is pumped by means of pump 16 to a suitable recovery and separation apparatus 18 wherein the reaction gases are separated and recovered.

To illustrate the manner in which the process of the present invention may be carried out, the following examples are given.

Example 1

In a series of separate batch runs $CCl_2F_2$ was passed between the electrodes of a discharge apparatus operating in the transitional discharge region of the type illustrated in the figure at pressures ranging from 200 to 400 millimeters of mercury absolute. The discharge chamber had a volume of 240 centimeters and contained a pair of copper electrodes. The interelectrode distance was 0.25 centimeter (cm.). A voltage of 200 to 320 volts/cm. with a current of 0.84 ampere was required to sustain the electrode discharge. The discharge chamber was evacuated and flushed with $CCl_2F_2$ prior to the introduction of $CCl_2F_2$ into the discharge chamber before each run.

The $CCl_2F_2$ was reacted in the area of transitional discharge for a period of one minute after which time the reaction mixture was removed from the discharge chamber. The reaction product consisting primarily of a mixture of $CF_4$, $CClF_3$, and unreacted $CCl_2F_2$, was cooled and collected for mass spectral analysis. The concentrations of $CF_4$, $CClF_3$ and $CCl_2F_2$ in the reaction product as well as the energy yield of $CF_4$ and $CClF_3$ in grams per kilowatt hour of electrical energy at the various pressures employed in the discharge chamber are summarized in Table I below.

For purposes of contrast, a second series of runs wherein $CCl_2F_2$ was exposed to the identical reaction conditions employed in the example above with the exception that gas pressures outside the scope of the present invention were employed in the discharge chamber was also made. The compositions of the discharge products prepared by these control runs designated by the symbol C as well as the energy yield of $CF_4$ and $CClF_3$ are also summarized in Table I below.

TABLE I

| Run No.: | $CCl_2F_2$ pressure in discharge chamber, mm. Hg abs. | Composition of discharge product (mole percent) | | | $CF_4$ energy yield (g./kw.-hr.) | $CClF_3$ energy yield (g./kw.-hr.) |
|---|---|---|---|---|---|---|
| | | $CF_4$ | $CClF_3$ | $CCl_2F_2$ | | |
| 1 | 200 | 13 | 45 | 25 | 34 | 145 |
| 2 | 300 | 18 | 42 | 22 | 64 | 180 |
| 3 | 400 | 20 | 37 | 28 | 82 | 191 |
| $C_1$ | 500 | 17 | 32 | 38 | 90 | 200 |
| $C_2$ | 600 | 14 | 26 | 50 | 83 | 197 |
| $C_3$ | 735 | 8 | 19 | 68 | 59 | 166 |
| $C_4$ | 50 | 1 | 10 | 85 | 2 | 10 |
| $C_5$ | 100 | 2 | 25 | 67 | 3 | 46 |

By referring to the above table, it is at once apparent that the conversions and energy yields of $CCl_2F_2$ to $CF_4$ and $CClF_3$ of the runs made in accordance with the process of the present invention (run numbers 1 thru 3) are substantially higher than those runs made outside the scope of the present invention (run numbers $C_i$ and $C_5$).

The data from the above table is graphically represented in FIG. 2. From the graph it can readily be seen that the optimum pressure is within the range of from 200 to 450 mm. Hg abs. It is seen that at 200 mm. Hg maximum chlorotrifluoromethane is produced, while at 400 mm. Hg maximum tetrafluoromethane is produced. Below 200 and above 400 mm. Hg production of chlorotrifluoromethane and tetrafluoromethane drop off sharply as increased quantities of dichlorodifluoromethane is retained.

Example 2

$CClF_3$ was reacted in the region of transitional discharge at pressures of 200 and 400 mm. Hg abs. at voltages of 240 volts/cm. and 300 volts/cm. respectively and a current of 0.95 ampere, following the procedure of Example 1. The concentrations of $CF_4$ in the reaction product and the energy yield of $CF_4$ at these reaction pressures are listed in Table II below.

TABLE II

| Run No.: | $CClF_3$ pressure in discharge chamber, mm. Hg abs. | Concentration of $CF_4$ in discharge product (mole percent) | $CF_4$ energy yield (g./kw.-hr.) |
|---|---|---|---|
| 7 | 200 | 24.2 | 57 |
| 8 | 400 | 79.8 | 300 |

The embodiments of the invention in which an exclusive property or privilege is claimed are defined as follows:

1. A process for preparing a material selected from the group consisting of tetrafluoromethane and chlorotrifluoromethane which comprises subjecting dichlorodifluoromethane to a transitional electrical discharge produced between a pair of metal electrodes at a current in the range of about 0.1 ampere to about 2.0 amperes and a voltage in the range of about 150 volts to about 450 volts per centimeter of interelectrode distance at a pressure within the range of about 200 to about 400 millimeters of mercury absolute.

2. The process of claim 1 wherein the chlorotrifluoromethane is converted to tetrafluoromethane by recycling the chlorotrifluoromethane produced in the process.

3. The process of claim 1 wherein the transitional electric discharge is produced between a pair of copper electrodes.

References Cited

UNITED STATES PATENTS 3,081,245   3/1963   Farlow _____ 204—169

OTHER REFERENCES

Thornton et al.: J.A.C.S., vol. 55, 1933, pp. 3177–82.

ROBERT K. MIHALEK, Primary Examiner

U.S. Cl. X.R.

204—312